(12) United States Patent
Zhang et al.

(10) Patent No.: US 12,153,332 B2
(45) Date of Patent: Nov. 26, 2024

(54) CAMERA MODULE STRUCTURE

(71) Applicant: ZHEJIANG SUNNY SMARTLEAD TECHNOLOGIES CO., LTD., Zhejiang (CN)

(72) Inventors: Kouwen Zhang, Zhejiang (CN); Zhi Ding, Zhejiang (CN); Baozhong Zhang, Zhejiang (CN)

(73) Assignee: ZHEJIANG SUNNY SMARTLEAD TECHNOLOGIES CO., LTD., Yuyao (CN)

( * ) Notice: Subject to any disclaimer, the term of this patent is extended or adjusted under 35 U.S.C. 154(b) by 277 days.

(21) Appl. No.: 17/958,834

(22) Filed: Oct. 3, 2022

(65) Prior Publication Data

US 2023/0027545 A1  Jan. 26, 2023

Related U.S. Application Data

(63) Continuation of application No. PCT/CN2020/103294, filed on Jul. 21, 2020.

(30) Foreign Application Priority Data

Jul. 2, 2020  (CN) .......................... 202010634529.4

(51) Int. Cl.
*G03B 17/02* (2021.01)
*G03B 17/56* (2021.01)

(52) U.S. Cl.
CPC ........... *G03B 17/02* (2013.01); *G03B 17/563* (2013.01)

(58) Field of Classification Search
CPC ...... G03B 17/02; G03B 17/563; G03B 30/00; G03B 17/55; G02B 7/026; G02B 7/02;
(Continued)

(56) References Cited

U.S. PATENT DOCUMENTS

2009/0110381 A1  4/2009  Yang
2013/0100271 A1*  4/2013  Howes ................... A61B 3/135
                                           348/E5.025
(Continued)

FOREIGN PATENT DOCUMENTS

CN  103661108 A  3/2014
CN  203961525 U  11/2014
(Continued)

OTHER PUBLICATIONS

International Search Report of PCT/CN2020/103294.
Written Opinion of PCT/CN2020/103294.

*Primary Examiner* — Usman A Khan

(57) ABSTRACT

A camera module structure, comprising: an upper housing (1) and a lens (2). The upper housing (1) comprises an accommodating part (11); the lens (2) is mounted in the accommodating part (11). The structure further comprises a circlip (3). The circlip (3) comprises a press part (31) and a clamp part (32). A guide groove (12) is provided on the upper housing (1). A clamp groove (21) is provided on the external peripheral wall of the lens (2). The clamp part (32) is engaged in the clamp groove (21) of the lens (2) along the guide groove (12). The camera module structure is convenient to assemble, and compared with screw connection, adhesive connection and other modes, problems such as vibration, falling-off and fracture would not happen, the imaging quality is good, and the service life is long.

16 Claims, 4 Drawing Sheets

(58) Field of Classification Search
CPC ........ H04N 23/55; H04N 23/50; H04N 23/51; H04N 23/52
USPC .................................................. 348/207.99
See application file for complete search history.

(56) References Cited

U.S. PATENT DOCUMENTS

2017/0299947 A1  10/2017  Nakamura et al.
2020/0124944 A1   4/2020  Ju

FOREIGN PATENT DOCUMENTS

| | | |
|---|---|---|
| CN | 206505247 U | 9/2017 |
| CN | 208172338 U | 11/2018 |
| CN | 208522861 U | 2/2019 |
| CN | 212543868 U | 2/2021 |
| JP | 579913 U | 1/1982 |
| JP | 2006323079 A | 11/2006 |
| JP | 2011507036 A | 3/2011 |
| JP | 2017201769 A | 11/2017 |
| JP | 2018097225 A | 6/2018 |
| JP | 2019012225 A | 1/2019 |
| KR | 20130077573 A | 7/2013 |
| WO | 2020100741 A1 | 5/2020 |

\* cited by examiner

CAMERA MODULE STRUCTURE

CROSS-REFERENCE TO RELATED APPLICATIONS

This application is a bypass continuation application of PCT application no.: PCT/CN2020/103294. This application claims priorities from PCT Application PCT/CN2020/103294, filed Jul. 21, 2020, and Chinese patent application No. 202010634529.4, titled "CAMERA MODULE STRUCTURE", filed with the Chinese National Intellectual Property Administration on Jul. 2, 2020, the entire disclosure of which is incorporated herein by reference.

TECHNICAL FIELD

The present disclosure belongs to the technical field of optics, and in particular relates to an on-vehicle camera module structure.

BACKGROUND

Nowadays, as the automobile industry is developing towards autonomous driving, automotive R&D personnel are increasingly focusing on active safety of automotive systems. To achieve active safety and autonomous driving, an advanced driver assistance system is the basis and also the key.

The application of cameras in the assistance system plays a significant role. Through front-view, rear-view, side-view, 360 degree-all-around-view camera modules and the like, functions such as adaptive cruise control, blind spot detection, collision avoidance, and parking assistance can be realized. To realize these functions, positional relationships between the camera modules and the automobile are very important, and whether the camera modules are well fixed directly determines the effects of the above functions and whether these functions can succeed or not.

Traditionally, the cameras are fixed mainly through screw connection, snap-fit connection, glue connection or the like. With the increase of use time, the screw connection, snap-fit connection and glue connection may have the risk of failure such as loosening, shaking and falling off or fracture. In addition, the above ways of connection require many structural parts, the assembly is complicated, and the cost is high.

SUMMARY

An object of the present disclosure is to provide a camera module structure, so as to solve the problems of loosening, shaking and falling off in the existing ways of fixing the cameras.

In order to achieve the above object, the present disclosure provides a camera module structure, which includes an upper casing and a lens; the upper casing has an accommodation part in which the lens is installed; the camera module structure further includes a circlip, which includes a pressing part and clamping parts; the upper casing is provided with a guide groove, an outer peripheral wall of the lens is provided with a clamping groove, and the clamping parts are clamped in the clamping groove of the lens along the guide groove.

According to an aspect of the present disclosure, the clamping parts have boss structures, and when the clamping parts are clamped in the clamping groove, the boss structures are located in the clamping groove.

According to an aspect of the present disclosure, a guide rib matching with the guide groove is provided on a side face at a front end of the clamping part.

According to an aspect of the present disclosure, a connection part is further provided between the pressing part and the clamping parts; and a side edge of the connection part is provided with a second guide rib matching with the guide groove.

According to an aspect of the present disclosure, the connection part is in the shape of a vertical plate, and the pressing part is perpendicularly connected to the connection part and has a horizontal pressing surface.

According to an aspect of the present disclosure, the upper casing is further provided with a limiting block, and the limiting block is located on one side of the guide groove and cooperates with the pressing part.

According to an aspect of the present disclosure, the guide groove is provided at a bottom of the upper casing.

According to an aspect of the present disclosure, the connection part is provided with a through hole.

According to an aspect of the present disclosure, the circlip is made of a material of carbon steel or spring steel.

According to an aspect of the present disclosure, the lens and the accommodation part of the upper casing match with each other through shaft and hole.

According to an aspect of the present disclosure, an installation plane is arranged on a peripheral wall at a terminal end of the lens to match with the upper casing.

According to an aspect of the present disclosure, the lens is an integral lens.

According to an aspect of the present disclosure, the camera module structure further includes a circuit board on which a photosensitive chip is arranged, and a terminal end of the lens is fixedly connected with the circuit board; and the circuit board includes a circuit substrate and a heat dissipation plate abutting against the circuit substrate.

According to an aspect of the present disclosure, the camera module structure further includes a lower casing which is connected with the upper casing.

According to a solution of the present disclosure, the circlip of the present disclosure includes a pressing part and clamping parts, the upper casing is further provided with a guide groove, the outer peripheral wall of the lens is provided with a clamping groove, and the circlip of the present disclosure can be placed in the guide groove. By pressing the pressing part of the circlip, the clamping parts of the circlip are finally clamped in the clamping groove of the lens, so that the position of the lens in the camera module can be fixed. As compared with the connection means in the prior art such as glue connection and screw connection, there will be no problems such as loosening, falling off, and fracture, which is advantageous for ensuring the imaging quality and service life of the lens. In addition, the circlip is provided in the present disclosure to fix the lens, which makes the assembly operation easier and faster as compared with the glue connection and screw connection.

According to a solution of the present disclosure, bosses are provided on the clamping parts of the circlip of the present disclosure, and when the clamping parts are clamped in the clamping groove of the lens, the bosses are located in the clamping groove, so that a force can be exerted on the lens in the horizontal direction to ensure that the lens will not be displaced in the horizontal direction and guarantee the positional accuracy of the lens.

According to a solution of the present disclosure, a guide rib is provided on a side face at a front end of the clamping part of the circlip, and a second guide rib is provided on a side face of the connection part. When installing the circlip into the guide groove, the guide rib and the second guide rib cooperate with the guide groove to play a guiding role, which facilitates a smooth installation of the circlip into the guide groove, prevents the circlip from being swung and deformed back and forth, and enables the clamping parts to finally fall into the correct position in the clamping groove of the lens.

According to a solution of the present disclosure, the lens of the present disclosure and the accommodation part of the upper casing match with each other through shaft and hole, so that a displacement of the lens in the horizontal direction can be limited and the position degree of the lens in the horizontal direction can be ensured. According to an embodiment of the present disclosure, an installation plane is provided on an outer peripheral wall at a terminal end of the lens to match with the upper casing, so as to realize fool-proofing and position limiting. After the lens is inserted into the upper casing, the wrong installation of the lens can be prevented, and it can be ensured that the lens will not rotate during installation and subsequent use, thus ensuring the imaging quality.

According to a solution of the present disclosure, the terminal end of the lens is fixedly connected with the circuit board. In the present disclosure, the circuit board includes a circuit substrate and a heat dissipation plate abutting against the circuit substrate. As a result, the heat of the photosensitive chip can be effectively dissipated; moreover, the strength is better, the deformation amount is small, the temperature drift of the lens is smaller, and the image is clearer.

According to a solution of the present disclosure, the lens in the present disclosure is an integral lens. As compared with the traditional structure of fixing the lens by applying glue, the lens does not have the risk of falling off due to the integral structure, and the center of gravity of the structure is located near the front, so it is less likely for the shaking to have an influence on the optical performance of the lens module.

DETAILED DESCRIPTION OF THE INVENTION

Figure 1:
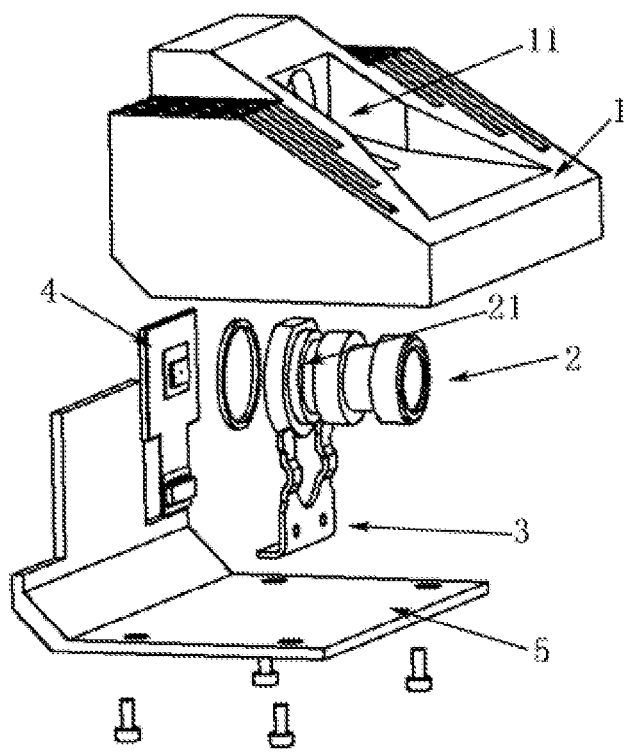
FIG. 1 schematically shows a component view of a camera module structure according to an embodiment of the present disclosure.

In order to more clearly illustrate the embodiments of the present disclosure or the technical solutions in the prior art, drawings required to be used in the embodiments will be briefly described below. Obviously, the drawings in the following description show only some of the embodiments of the present disclosure, and those skilled in the art can also obtain other drawings based on these drawings without creative efforts.

When describing the embodiments of the present disclosure, the orientations or positional relationships described by the terms "longitudinal", "transverse", "upper", "lower", "front", "rear", "left", "right", "vertical", "horizontal", "top", "bottom", "inner" and "outer" are based on the orientations or positional relationships shown in the related drawings. These terms are merely used for the sake of facilitating describing the present disclosure and simplifying the description, and do not indicate or imply that the device or element involved must have a particular orientation, or must be constructed or operated in a particular orientation. Therefore, the above terms should not be construed as limiting the present disclosure.

The present disclosure will be described in detail below with reference to the drawings and specific embodiments. It is impossible to describe all the embodiments exhaustively herein, but the embodiments of the present disclosure are not limited to the following embodiments.

As shown in FIGS. 1 to 8, the camera module structure of the present disclosure includes an upper casing 1, a lens 2, a circlip 3, a circuit board 4 and a lower casing 5.

Figure 2:
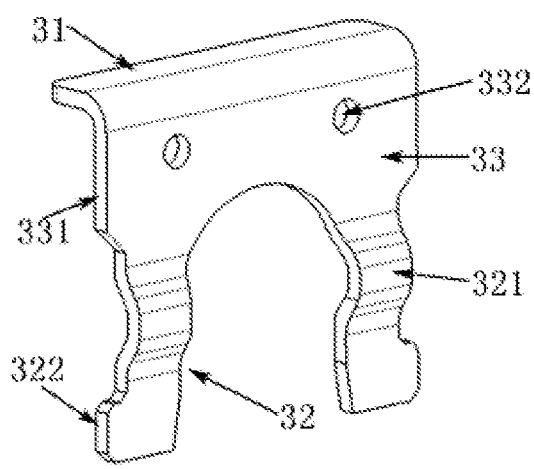
FIG. 2 schematically shows a structural view of a circlip according to an embodiment of the present disclosure.
Figure 3:
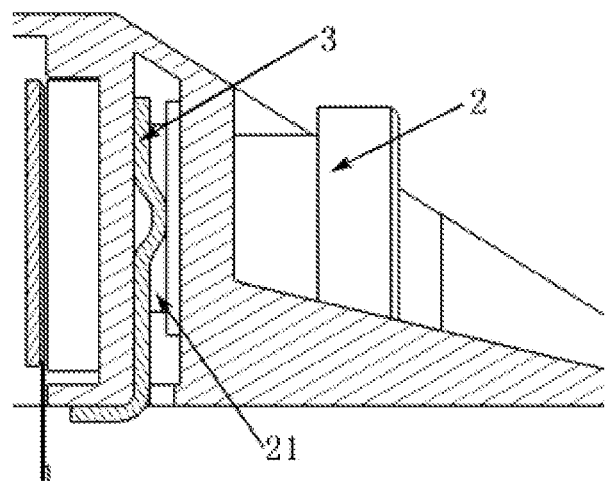
FIG. 3 schematically shows a cross-sectional view of a lens, the circlip and an upper casing after assembly according to the present disclosure.

In the present disclosure, the upper casing 1 is provided with an accommodation part 11, and the lens 2 of the present disclosure is installed in the accommodation part 11 of the upper casing 1. As shown in FIGS. 2 to 3, the circlip 3 of the present disclosure includes a pressing part 31 and clamping parts 32; the upper casing 1 is further provided with a guide groove 12, and an outer peripheral wall of the lens 2 is provided with a clamping groove 21. The circlip 3 of the present disclosure can be placed in the guide groove 12, and by pressing the pressing part 31 of the circlip 3, the clamping parts 32 of the circlip 3 are finally clamped in the clamping groove 21 of the lens 2, so that the position of the lens 2 in the camera module can be fixed. As compared with the connection means in the prior art such as glue connection and screw connection, there will be no problems such as loosening, falling off and fracture, which is advantageous for ensuring the imaging quality and service life of the lens. In addition, the circlip 3 is provided in the present disclosure to fix the lens 2, which makes the assembly operation easier and faster as compared with the glue connection and screw connection.

As shown in FIGS. 2 and 3, the clamping parts 32 of the circlip 3 of the present disclosure are provided with boss structures 321, and when the clamping parts 32 are clamped in the clamping groove 21 of the lens 2, the boss structures 321 are located inside the clamping groove 21. In this embodiment, the clamping groove 21 is arranged into a vertical shape. The boss structures 321 are configured as circular arc-shaped bosses. The bosses 321 are located inside the clamping groove 21, and can exert a force on the lens 2 in the horizontal direction to ensure that the lens 2 will not be displaced in the horizontal direction and guarantee the positional accuracy of the lens 2.

According to the concept of the present disclosure, the shape of the clamping groove 21 is not limited. According to other embodiments of the present disclosure, the clamping groove 21 can be provided as a groove with a certain inclination angle, and the corresponding circlip 3 also has a deflection angle. Through such an arrangement, the lens can also be fixed and limited.

In the present disclosure, the circlip 3 is made of carbon steel material or a material with elasticity such as spring steel. Of course, according to the concept of the present disclosure, in order to ensure the fixing effect of the circlip on the lens 2, the elasticity of the circlip 3 has to be different at different positions. The requirement on the elasticity is the highest at the boss structures 321. According to an embodiment of the present disclosure, the thickness can be made thinner at the boss structures 321 so that it is smaller than the thickness at the pressing part 31 of the circlip 3 to further improve the elasticity.

Figure 4:
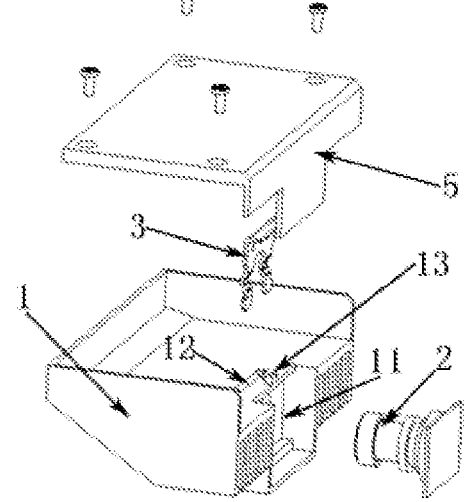
FIG. 4 schematically shows a component view of the camera module structure according to an embodiment of the present disclosure.
Figure 5:
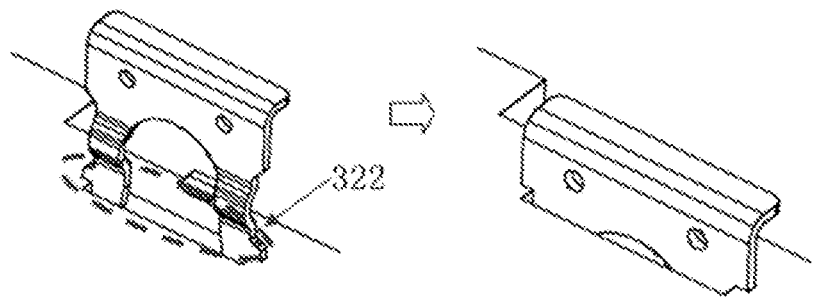
FIG. 5 schematically shows an installation view of the circlip according to the present disclosure.

As shown in FIGS. 2, 4 and 5, the circlip 3 of the present disclosure further includes a connection part 33, and the connection part 33 is located between the pressing part 31 and the clamping parts 32. According to an embodiment of the present disclosure, a guide rib 322 is provided on a side face at a front end of the clamping part 32 of the circlip 3, and a second guide rib 331 is provided on a side face of the connection part 33. When installing the circlip 3 into the guide groove 12, the guide rib 322 and the second guide rib 331 cooperate with the guide groove 12 to play a guiding role, which facilitates a smooth installation of the circlip 3 into the guide groove 12, prevents the circlip 3 from being deformed back and forth, and enables the clamping parts 32 to finally fall into the correct position in the clamping groove 21 of the lens 2.

As shown in FIG. 2, according to an embodiment of the present disclosure, the connection part 33 of the circlip 3 is provided as a vertical plate-like structure, and is in a vertical state during installation. The pressing part 31 is arranged perpendicular to the connection part 33, is in a horizontal state, and has a horizontal pressing surface, thus facilitating a smooth installation of the circlip 3.

Figure 6:
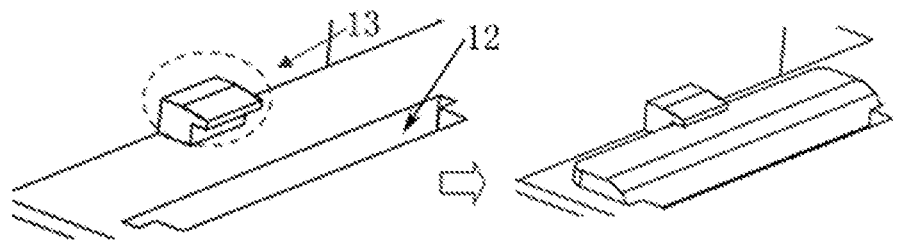
FIG. 6 schematically shows a view of the cooperation between the circlip and a limiting block according to the present disclosure.
Figure 7:
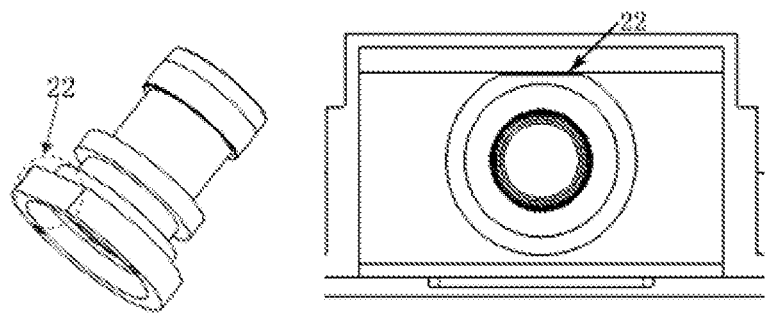
FIG. 7 schematically shows a structural view of the lens according to an embodiment of the present disclosure.
Figure 8:
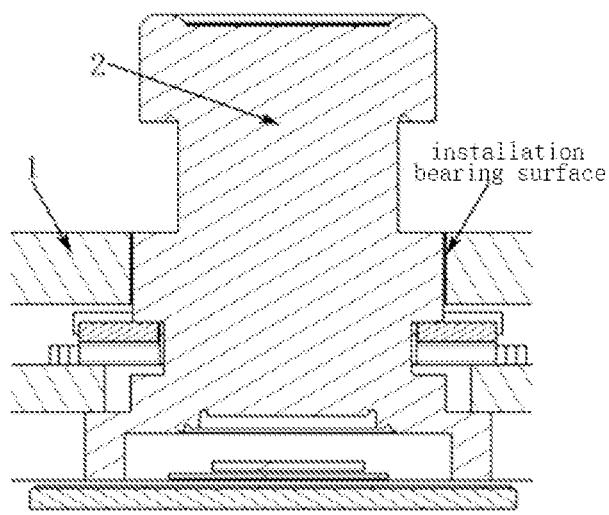
FIG. 8 schematically shows a cross-sectional view of the assembly of the lens and the upper casing according to an embodiment of the present disclosure.

As shown in FIGS. 2, 4 and 6, the upper casing 1 of the present disclosure is further provided with a limiting block 13, and the limiting block 13 is arranged on one side of the guide groove 12. The circlip 3 of the present disclosure is installed downward along the guide groove 12, and finally the horizontal pressing surface of the pressing part 31 of the circlip 3 is located below the limiting block 13 and abuts against the limiting block. As such, it can be ensured that the circlip 3 will not fall off due to shaking and other factors after installation, and the fixing and limiting effect on the lens 2 can always be guaranteed.

According to an embodiment of the present disclosure, the pressing part 31 is provided with a horizontal pressing surface, and a lower end face of the limiting block 13 is also provided as a horizontal surface, so as to ensure that the pressing part 31 and the limiting block 13 can closely cooperate with each other to guarantee the limiting effect. Of course, according to the concept of the present disclosure, the pressing surface and the lower end face of the limiting block 13 are not limited to the above arrangement, and they can also be configured as arc-shaped surfaces that cooperate with each other, etc.

As shown in FIGS. 1 and 4, according to an embodiment of the present disclosure, the guide groove 12 of the present disclosure is arranged at the bottom of the upper casing 1. Specifically, the upper casing 1 can be turned over first so that the bottom thereof faces upward, then the lens 2 is installed into the accommodation part 11 of the upper casing 1 from a rear end, next the circlip 3 is installed into the guide groove 12, and finally the lower casing 5 is fixedly connected to the upper casing 1 from above by means of screw, glue, etc. In this way, after the circlip 3 is installed, the appearance of the camera module structure of the present disclosure will not be affected, and the dustproof and waterproof requirements can be met. Of course, according to the concept of the present disclosure, the arrangement position of the guide groove 12 is not limited, and can be set according to specific requirements.

As shown in FIG. 2, the connection part 33 of the circlip 3 of the present disclosure is also provided with a through hole 332. Therefore, when disassembly is required, a barb jig can be used to hook the through hole 332 so that the circlip 3 can be pulled out upward. The operation is convenient. On the other hand, the through hole 332 can also be used as a hanging point position during surface treatment of the circlip. Specifically, in order to prevent rusting of the circlip, the circlip usually has to undergo surface oxidation treatment. At this time, the through hole 322 can be used as the hanging point for the treatment of the circlip 3.

As shown in FIGS. 1, 4, 7 and 8, the lens 2 of the present disclosure and the accommodation part 11 of the upper casing 1 match with each other through shaft and hole, so that a displacement of the lens 2 in the horizontal direction can be limited and the position degree of the lens in the horizontal direction can be ensured. According to an embodiment of the present disclosure, an installation plane 22 is provided on an outer peripheral wall at a terminal end of the lens 2 to match with the upper casing 1, so as to realize fool-proofing and position limiting. After the lens 2 is inserted into the upper casing 1, the wrong installation of the lens 2 can be prevented, and it can be ensured that the lens 2 will not rotate during installation and subsequent use, thus ensuring the imaging quality.

As shown in FIG. 1, the circuit board 4 of the present disclosure is provided with a photosensitive chip, and the terminal end of the lens is fixedly connected with the circuit board. In the present disclosure, the circuit board 4 includes a circuit substrate and a heat dissipation plate abutting against the circuit substrate. As a result, the heat of the photosensitive chip can be effectively dissipated; moreover, the strength is better, the deformation amount is small, the temperature drift of the lens is smaller, and the image is clearer. The heat dissipation plate may be a steel reinforced plate, an aluminum plate, or a ceramic plate, or may be made of other materials with a good heat dissipation function.

According to an embodiment of the present disclosure, the lens 2 in the present disclosure is an integral lens. As compared with the traditional structure of fixing the lens by applying glue, the lens does not have the risk of falling off due to the integral structure, and the center of gravity of the structure is located near the front, so it is less likely for the shaking to have an influence on the optical performance of the lens module.

Figure 9:
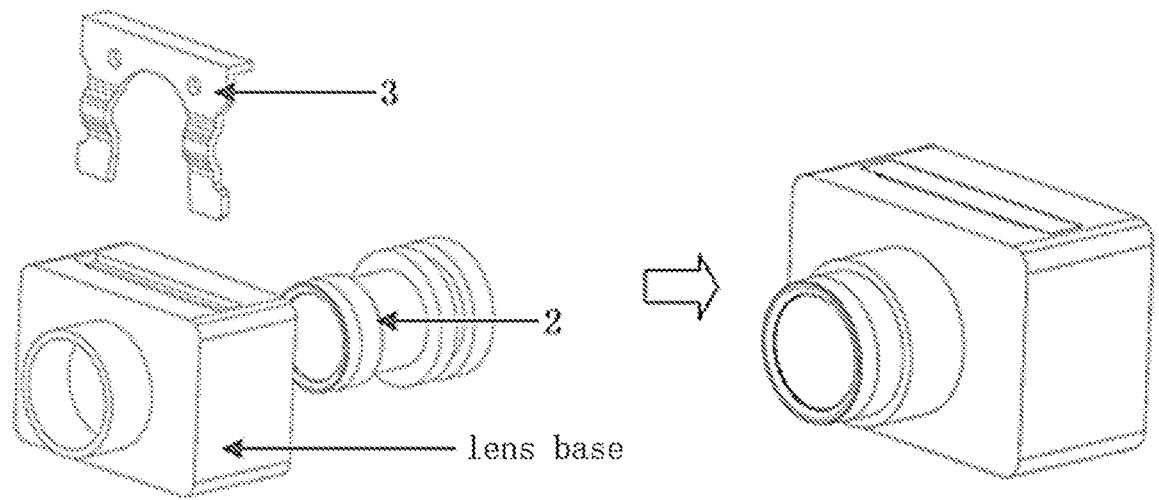
FIG. 9 schematically shows an assembly view when the circlip according to the present disclosure is applied to the lens and a lens base.

Of course, according to the concept of the present disclosure, the idea of clamping and fixing through the circlip 3 can also be applied to other structures, such as between the lens and a lens base. As shown in FIG. 9, for a split lens solution, the circlip can be used to limit the front-and-rear displacement of the lens. First, the lens 2 is inserted into the lens base to ensure that a bearing surface of the lens 2 closely abuts against a bearing surface in the lens base, and then the circlip 3 is inserted into the lens base, so that the circlip 3 can enter the lens base along the guide groove without bending or deforming. After the circlip is inserted, the lens is subjected to a continuous rebounding force of the circlip, and finally the circlip is snap-fit at a snap-fit point of the lens base, thus completing the assembly.

Described above is only one embodiment of the present disclosure, which is not intended to limit the present disclosure. For those skilled in the art, various modifications and changes can be made to the present disclosure. Any modification, equivalent substitution, improvement or the like made within the spirit and principle of the present disclosure are intended to be included in the scope of protection of the present disclosure.

The invention claimed is:

1. A camera module structure, comprising an upper casing (1) and a lens (2), the upper casing (1) having an accommodation part (11) in which the lens (2) is installed; wherein the camera module structure further comprises a circlip (3) which comprises a pressing part (31) and clamping parts (32); the upper casing (1) is provided with a guide groove (12), an outer peripheral wall of the lens (2) is provided with a clamping groove (21), and the clamping parts (32) are clamped in the clamping groove (21) of the lens along the guide groove (12).

2. The camera module structure according to claim 1, wherein the clamping parts (32) have boss structures (321), and when the clamping parts (32) are clamped in the clamping groove (21), the boss structures (321) are located in the clamping groove (21).

3. The camera module structure according to claim 2, wherein a guide rib (322) matching with the guide groove (12) is provided on a side face at a front end of the clamping part (32).

4. The camera module structure according to claim 1, wherein a connection part (33) is further provided between the pressing part (31) and the clamping parts (32); and
a side edge of the connection part (33) is provided with a second guide rib (331) matching with the guide groove (12).

5. The camera module structure according to claim 4, wherein the connection part (33) is in the shape of a vertical plate, and the pressing part (31) is perpendicularly connected to the connection part (33) and has a horizontal pressing surface.

6. The camera module structure according to claim 5, wherein the upper casing (1) is further provided with a limiting block (13), and the limiting block (13) is located on one side of the guide groove (12) and cooperates with the pressing part (31).

7. The camera module structure according to claim 6, wherein the guide groove (2) is provided at a bottom of the upper casing (1).

8. The camera module structure according to claim 5, wherein the connection part (33) is provided with a through hole (332).

9. The camera module structure according to claim 1, wherein the circlip (3) is made of a material of carbon steel or spring steel.

10. The camera module structure according to claim 1, wherein the lens (2) and the accommodation part (11) of the upper casing (1) match with each other through shaft and hole.

11. The camera module structure according to claim 10, wherein an installation plane (22) is arranged on a peripheral wall at a terminal end of the lens (2) to match with the upper casing (1).

12. The camera module structure according to claim 1, wherein the lens (2) is an integral lens.

13. The camera module structure according to claim 1, wherein the camera module structure further comprises a circuit board (4) on which a photosensitive chip is arranged, and a terminal end of the lens (2) is fixedly connected with the circuit board (4); and
the circuit board (4) comprises a circuit substrate and a heat dissipation plate abutting against the circuit substrate.

14. The camera module structure according to claim 1, wherein the camera module structure further comprises a lower casing (5) which is connected with the upper casing (1).

15. The camera module structure according to claim 2, wherein a connection part (33) is further provided between the pressing part (31) and the clamping parts (32); and
a side edge of the connection part (33) is provided with a second guide rib (331) matching with the guide groove (12).

16. The camera module structure according to claim 3, wherein a connection part (33) is further provided between the pressing part (31) and the clamping parts (32); and
a side edge of the connection part (33) is provided with a second guide rib (331) matching with the guide groove (12).

* * * * *